(12) United States Patent
Kosugi et al.

(10) Patent No.: US 10,279,727 B2
(45) Date of Patent: May 7, 2019

(54) VEHICLE LIGHTING DEVICE AND VEHICLE LAMP

(71) Applicant: Toshiba Lighting & Technology Corporation, Yokosuka-shi, Kanagawa-ken (JP)

(72) Inventors: Daisuke Kosugi, Yokosuka (JP); Atsushi Heike, Yokosuka (JP)

(73) Assignee: Toshiba Lighting & Technology Corporation, Yokosuka-shi, Kanagawa-ken (JP)

(*) Notice: Subject to any disclaimer, the term of this patent is extended or adjusted under 35 U.S.C. 154(b) by 0 days.

(21) Appl. No.: 15/903,359

(22) Filed: Feb. 23, 2018

(65) Prior Publication Data
US 2019/0077301 A1 Mar. 14, 2019

(30) Foreign Application Priority Data
Sep. 13, 2017 (JP) .................. 2017-175762

(51) Int. Cl.
*B60Q 1/00* (2006.01)
*H05B 33/08* (2006.01)

(52) U.S. Cl.
CPC ....... *B60Q 1/0094* (2013.01); *H05B 33/0806* (2013.01); *H05B 33/0845* (2013.01)

(58) Field of Classification Search
CPC .......... H01J 25/55; H01J 25/587; H01J 23/20; H01J 23/207; H01J 23/005; F21V 23/02; F21V 25/12; H05B 37/0236; A63J 17/00; F21L 14/026; B60Q 3/0293; B60Q 11/005; B60Q 1/387; B60Q 1/2603; B60Q 3/048315; B60Q 1/143; B60Q 1/1423; B60Q 9/001; B60Q 2300/112; B60R 16/03; H02K 21/48; B62J 6/003; H02J 7/1492
See application file for complete search history.

(56) References Cited

U.S. PATENT DOCUMENTS 9,420,644 B1 8/2016 Shum
9,769,891 B2 9/2017 Baccarin et al.
(Continued)

FOREIGN PATENT DOCUMENTS

CN 206459131 U 9/2017
DE 10 2006 024607 A1 11/2007
(Continued)

OTHER PUBLICATIONS

Aug. 2, 2018—(EP) Extended EP Search Report—App 18158157.0.
(Continued)

*Primary Examiner* — Minh D A
(74) *Attorney, Agent, or Firm* — Banner & Witcoff, Ltd.

(57) ABSTRACT

According to one embodiment, a vehicle lighting device includes a plurality of circuit portions each of which has at least one light emitting element; and a control portion that is electrically connected to the plurality of the circuit portions. The control portion connects the plurality of the circuit portions in series if an input voltage exceeds a predetermined value, and connects at least a part of the plurality of the circuit portions in parallel if the input voltage is equal to or less than the predetermined value. The predetermined value is a value equal to or more than a voltage corresponding to a current value used for failure determination of the vehicle lighting device.

17 Claims, 10 Drawing Sheets

(56) References Cited

U.S. PATENT DOCUMENTS

| | | | |
|---|---|---|---|
| 2011/0148301 A1 | 6/2011 | Schnerr et al. | |
| 2012/0139448 A1* | 6/2012 | Chiang | H05B 33/083 |
| | | | 315/307 |
| 2014/0062314 A1 | 3/2014 | Moskowitz | |
| 2015/0230298 A1* | 8/2015 | Chu | H05B 33/0815 |
| | | | 315/186 |
| 2016/0121783 A1* | 5/2016 | Takagimoto | B60Q 11/005 |
| | | | 315/82 |
| 2017/0009953 A1 | 1/2017 | Kosugi et al. | |
| 2018/0029527 A1 | 2/2018 | Kosugi et al. | |

FOREIGN PATENT DOCUMENTS

| | | |
|---|---|---|
| EP | 2 685 789 A1 | 1/2014 |
| EP | 3118059 A1 | 1/2017 |
| JP | 2015-063252 A | 4/2015 |
| WO | 2009/156590 A1 | 12/2009 |

OTHER PUBLICATIONS

Oct. 18, 2017—(EP) Extended Search Report—App 17159981.4.
Apr. 6, 2018—U.S. Non-Final Office Action—U.S. Appl. No. 15/454,037.
Nov. 20, 2018—(US) Non-Final Office Action—U.S. Appl. No. 15/454,037.

* cited by examiner

VEHICLE LIGHTING DEVICE AND VEHICLE LAMP

CROSS-REFERENCE TO RELATED APPLICATIONS

This application is based upon and claims the benefit of priority from Japanese Patent Application No. 2017-175762, filed on Sep. 13, 2017; the entire contents of which are incorporated herein by reference.

FIELD

Embodiments described herein relate generally to a vehicle lighting device and a vehicle lamp.

BACKGROUND

A detecting device that detects a failure of a vehicle lighting device is provided in a vehicle in which the vehicle lighting device is provided. For example, if the detecting device detects a current flowing through a plurality of light emitting diodes which are connected in series and the detected current becomes a predetermined value or less, it is determined that a failure such as disconnection occurs in at least a part of the plurality of the light emitting diodes. If it is determined that a failure occurs, for example, the detecting device causes a display for notifying the failure of the vehicle lighting device to be turned on in a meter panel.

In this case, a vehicle lighting device including an incandescent light bulb and a vehicle lighting device including a light emitting diode may be selectively used depending on a grade of a vehicle type or the like. On the other hand, in many cases, the same detecting device is used to detect the failure of the vehicle lighting device regardless of the grade of the vehicle type or the like. If the detecting device is also used, since the number of thresholds for determining the failure is one, there is a concern that erroneous detection occurs.

Here, a voltage (input voltage) applied to the vehicle lighting device fluctuates. If the input voltage decreases, the amount of light emitted from the plurality of the light emitting diodes decreases so that there is a concern that a total luminous flux of the vehicle lighting device is less than a specified value. In addition, if the threshold based on the current flowing through the incandescent light bulb is used for determining the failure, there is a concern that it is determined that the failure occurs even if there is no failure when the input voltage decreases.

Therefore, it is desired to develop a technique in which, when the input voltage decreases, it is possible to secure a required total luminous flux and to suppress erroneous detection related to the occurrence of the failure.

DETAILED DESCRIPTION

Figure 1:
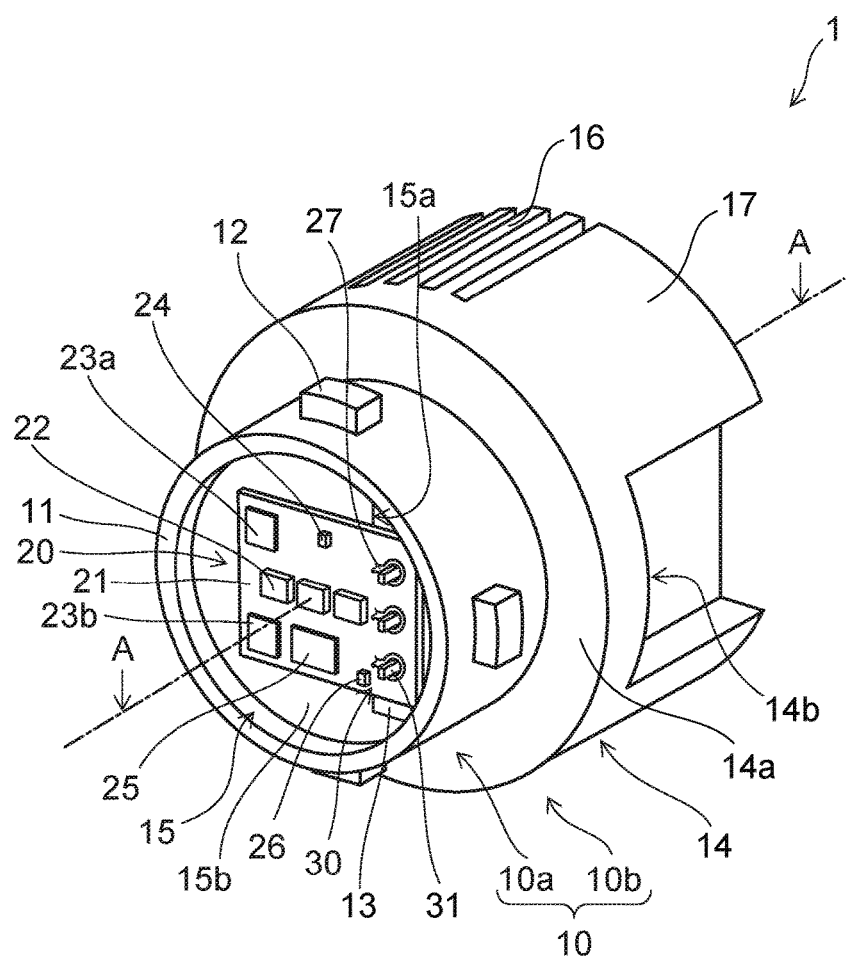
FIG. 1 is a schematic perspective view illustrating a vehicle lighting device according to an embodiment.

In general, according to one embodiment, a vehicle lighting device includes a plurality of circuit portions each of which has at least one light emitting element; and a control portion that is electrically connected to the plurality of the circuit portions. The control portion connects the plurality of the circuit portions in series if an input voltage exceeds a predetermined value, and connects at least a part of the plurality of the circuit portions in parallel if the input voltage is equal to or less than the predetermined value. The predetermined value is a value equal to or more than a voltage corresponding to a current value used for failure determination of the vehicle lighting device.

Hereinafter, embodiments will be described with reference to the drawings. Moreover, the same reference numerals are given to the same configuration elements in each drawing and detailed description will be appropriately omitted.

A vehicle lighting device 1 of the embodiment, for example, can be provided in automobiles, railway vehicles, or the like. As the vehicle lighting device 1 provided in the automobile, for example, a front combination light (formed by appropriately combining, for example, a daytime running lamp (DRL), a position lamp, a turn signal lamp, and the like), a rear combination light (formed by appropriately combining, for example, a stop lamp, a tail lamp, a turn signal lamp, a back lamp, a fog lamp, and the like), and the like can be exemplified. However, application of the vehicle lighting device 1 is not limited to the examples.

FIG. 1 is a schematic perspective view illustrating the vehicle lighting device 1 according to the embodiment.

Figure 2:
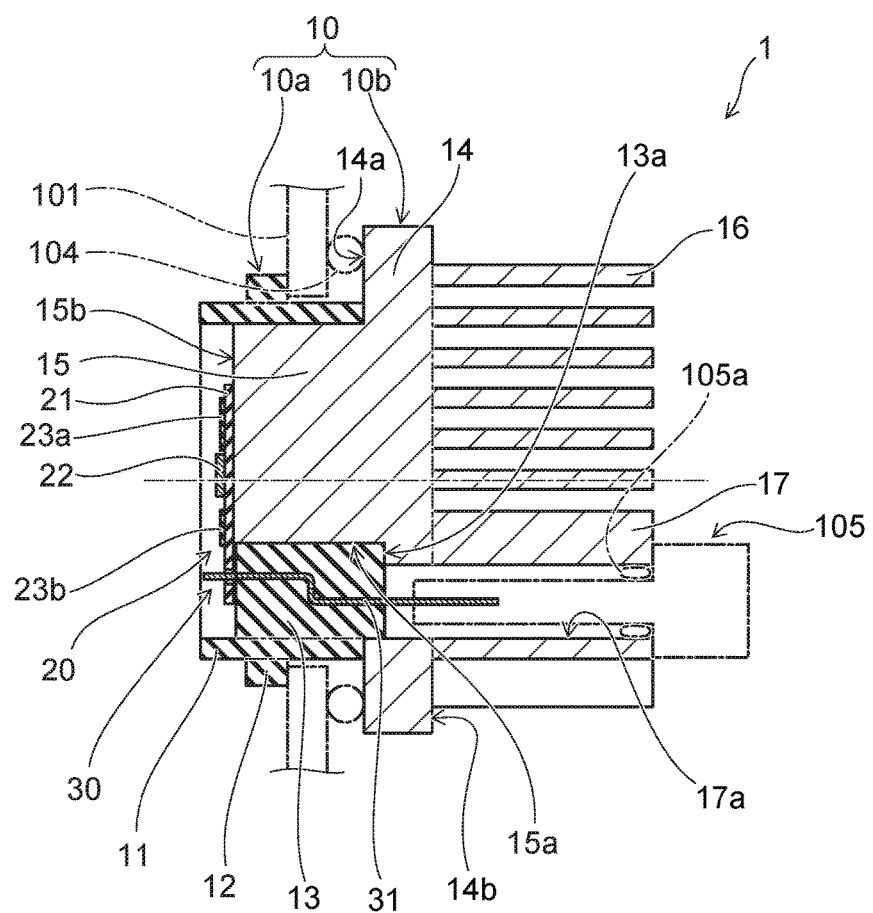
FIG. 2 is a schematic sectional view of the vehicle lighting device viewed in a direction of line A-A in FIG. 1.

FIG. 2 is a schematic sectional view of the vehicle lighting device 1 viewed in a direction of line A-A in FIG. 1.

As illustrated in FIGS. 1 and 2, the vehicle lighting device 1 is provided with a socket 10, a light emitting module 20, and a power supplying portion 30.

The socket 10 has a storage portion 10a and a heat radiating portion 10b.

The storage portion 10a has a mounting portion 11, bayonets 12, and an insulating portion 13.

The mounting portion 11 may have, for example, a cylindrical shape. The mounting portion 11 is provided on a side of a flange 14 opposite to a side in which heat radiating fins 16 are provided. The mounting portion 11 surrounds a loading portion 15.

The bayonets 12 are provided on a side surface of the mounting portion 11 and protrude outward the vehicle lighting device 1. A plurality of the bayonets 12 are provided. The bayonets 12 are used when attaching the vehicle lighting device 1 to a vehicle lamp 100 by a twist-lock.

The insulating portion 13 is provided on an inside of the mounting portion 11.

The storage portion 10a has a function of storing the light emitting module 20 and a function of insulating power supply terminals 31. Therefore, it is preferable that the mounting portion 11, the bayonets 12, and the insulating portion 13 are formed of an insulating material. The insulating material can be, for example, an organic material such as resin, an inorganic material such as ceramics (for example, aluminum oxide, aluminum nitride, or the like), or the like.

The heat radiating portion 10b has the flange 14, the loading portion 15, the heat radiating fins 16, and a projection portion 17.

The flange 14 can have, for example, a disk shape. An outside surface of the flange 14 is positioned on the outside of the vehicle lighting device 1 more than the outside surface of the bayonet 12.

The loading portion 15 can have a columnar shape. The loading portion 15 is provided on a surface 14a of the flange 14 on a side opposite to the side in which the heat radiating fins 16 are provided. A recessed portion 15a is provided on the side surface of the loading portion 15. The insulating portion 13 is provided on the inside of the recessed portion 15a. The light emitting module 20 (substrate 21) is provided on a surface 15b of the loading portion 15 on a side opposite to the flange 14 side.

The heat radiating fins 16 are provided on a surface 14b of the flange 14 on a side opposite to the side in which the loading portion 15 is provided. A plurality of the heat radiating fins 16 can be provided. The plurality of the heat radiating fins 16 can be provided to parallel to each other. The heat radiating fins 16 can have a plate shape.

The projection portion 17 has a function of protecting an end portion of the power supply terminal 31 and a function of holding a connector 105. The projection portion 17 is provided on the surface 14b of the flange 14 in which the heat radiating fins 16 are provided. The projection portion 17 can have a block shape. A hole 17a is provided in the projection portion 17. The connector 105 having a sealing member 105a is inserted into the hole 17a.

The heat radiating portion 10b has a function of loading the light emitting module 20 and a function of discharging heat generated in the light emitting module 20 to the outside. Therefore, in consideration of a function of radiating heat, it is preferable that the flange 14, the loading portion 15, the heat radiating fins 16, and the projection portion 17 are formed of a material having high thermal conductivity. The material having high thermal conductivity can be metal such as aluminum and aluminum alloy, ceramics such as aluminum oxide and aluminum nitride, resin having high thermal conductivity, or the like. Resin having high thermal conductivity is obtained, for example, by mixing a filler made of aluminum oxide or carbon having high thermal conductivity to resin such as polyethylene terephthalate (PET) or nylon.

In addition, the heat radiating portion 10b is joined to the storage portion 10a. The storage portion 10a and the heat radiating portion 10b may be fitted into each other, or may be joined using adhesive and the like. The storage portion 10a and the heat radiating portion 10b may be joined by insert molding, or the storage portion 10a and the heat radiating portion 10b may be joined by heat welding.

The light emitting module 20 is provided on the surface 15b of the loading portion 15 on the side opposite to the flange 14 side.

The light emitting module 20 has the substrate 21, a light emitting element 22, a resistor 23a, a resistor 23b, a diode 24, a control portion 25, and a diode 26.

The substrate 21 is provided on the surface 15b of the loading portion 15. The substrate 21 has a plate shape. A wiring pattern 27 is provided on the surface of the substrate 21. Considering that heat generated in the light emitting element 22 is efficiently transferred to the heat radiating portion 10b, it is preferable that the substrate 21 is formed of a material having high thermal conductivity. The material having high thermal conductivity can be, for example, ceramics (for example, aluminum oxide, aluminum nitride, and the like), a metal plate of which a surface is covered with an insulating material, or the like. In addition, the substrate 21 may be a single layer structure or may be a multi-layer structure.

The light emitting element 22 is provided on the substrate 21. The light emitting element 22 is electrically connected to the wiring pattern 27 provided on the surface of the substrate 21. The light emitting element 22 can be, for example, a light emitting diode, an organic light emitting diode, a laser diode, and the like.

A form of the light emitting element 22 is not particularly limited. The light emitting element 22 can be a light emitting element of a surface mounting type such as Plastic Leaded Chip Carrier (PLCC) type. Moreover, the light emitting element 22 illustrated in FIGS. 1 and 2 is the light emitting element of the surface mounting type.

The light emitting element 22 can be, for example, a light emitting element having a lead wire of a shell type and the like.

In addition, the light emitting element 22 can be mounted by Chip On Board (COB). In a case of the light emitting element 22 that is mounted by the COB, it is possible to provide the light emitting element 22 of a chip shape, wiring electrically connecting the light emitting element 22 and the wiring pattern 27, a frame-like member surrounding the light emitting element 22 and the wiring, a sealing portion provided on an inside of the frame-like member, and the like on the substrate 21. In this case, the sealing portion can contain a phosphor. The phosphor can be, for example, an yttrium-aluminum-garnet based phosphor (YAG based phosphor) or the like. Moreover, the type of the phosphor is not limited to the example. The type of the phosphor can be appropriately changed so that a desired luminescent color can be obtained according to the use of the vehicle lighting device 1.

The resistors 23a and 23b are provided on the substrate 21. The resistors 23a and 23b are electrically connected to the wiring pattern 27 provided on the surface of the substrate 21. The resistors 23a and 23b control a current flowing through the light emitting element 22.

Since there are variations in forward voltage characteristics of the light emitting element 22, if an applied voltage between an anode terminal and a ground terminal is constant, variations occur in brightness (luminous flux, luminance, luminous intensity, and illuminance) of the light emitting element 22. Therefore, a value of the current flowing through the light emitting element 22 is made to fall within a predetermined range by the resistors 23a and 23b so that the brightness of the light emitting element 22 falls within a predetermined range. In this case, a value of the current flowing through the light emitting element 22 can be within a predetermined range by changing resistance values of the resistors 23a and 23b.

The resistors 23a and 23b can be, for example, resistors of a surface mounting type, resistors (metal oxide film resistor) having a lead wire, film-like resistors formed using a screen printing method, and the like. Moreover, if the film-like resistor is used, adjustment of the resistance value is easy. Therefore, it is preferable that the resistors 23a and 23b are the film-like resistors. In this case, the adjustment of the resistance value can be performed as follows. First, the film-like resistor is formed on the surface of the substrate 21 using a screen printing method or the like. Next, a part of the film-like resistors is removed by emitting laser light. Then, the resistance value of the film-like resistor is changed by a size of the removed portion and the like. In this case, if a part of the film-like resistors is removed, the resistance value increases. Moreover, the resistors 23a and 23b illustrated in FIGS. 1 and 2 are the film-like resistors. The number, sizes, and arrangements of the resistors 23a and 23b, and the like are not limited to the examples described above, and can be appropriately changed in accordance with the number and a specification of the light emitting element 22, and the like.

The control portion 25 is provided on the substrate 21. The control portion 25 is electrically connected to the wiring pattern 27 provided on the surface of the substrate 21. The control portion 25 connects a plurality of circuit portions (for example, circuit portion 20a and 20b) in series when an input voltage exceeds a predetermined value, and connects at least a part of the plurality of the circuit portions in parallel when the input voltage is the predetermined value (see FIGS. 5A to 12). For example, the control portion 25 detects an input voltage and can switch a connection state (connection in series or connection in parallel) of the plurality of the circuit portions based on the detected input voltage.

In addition, the control portion 25 has a switching circuit using a switching element such as a transistor and a connection state of the plurality of the circuit portions can be automatically switched according to the input voltage. Moreover, a known technique can be used for the switching circuit. Therefore, in the following description, a case where the control portion 25 detects the input voltage and the connection state of the plurality of the circuit portions is switched based on the detected input voltage will be described.

The diode 24 is provided on the substrate 21. The diode 24 is electrically connected to the wiring pattern 27 provided on the surface of the substrate 21. The diode 24 is provided so that a reverse voltage is not applied to one of the light emitting elements 22 when the connection of the plurality of the circuit portions are switched from the connection in series to the connection in parallel (see FIGS. 5A to 8, and 10).

The diode 26 is provided on the substrate 21. The diode 26 is electrically connected to the wiring pattern 27 provided on the surface of the substrate 21. The diode 26 is provided on an input side of the light emitting module 20. The diode 26 is provided so that the reverse voltage is not applied to the light emitting element 22 and pulse noise is not applied to the light emitting element 22 from a reverse direction.

In addition, it is also possible to provide a cover portion for covering the wiring pattern 27, the film-like resistor, and the like. The cover portion can include, for example, a glass material.

Moreover, details of connection of the light emitting element 22, the resistor 23a, the resistor 23b, the diode 24, the control portion 25, and the diode 26 will be described later.

The power supplying portion 30 has a plurality of the power supply terminals 31. The plurality of the power supply terminals 31 are provided on the inside of the socket 10 (insulating portion 13). One-side end portion of the plurality of the power supply terminals 31 protrudes from an end surface of the insulating portion 13 on a side opposite to the flange 14 side and is electrically connected to the wiring pattern 27 provided in the substrate 21. The other end portion of the plurality of the power supply terminals 31 protrudes from the end surface 13a of the insulating portion 13 on the flange 14 side. The other end portion of the plurality of the power supply terminals 31 is exposed on the inside of the hole 17a. The number and a shape of the power supply terminals 31, and the like are not limited to the examples described above, and can be appropriately changed.

Next, the light emitting module 20 will be further described.

First, light emitting modules 200 and 210 according to a comparison example will be described.

Figure 3A:
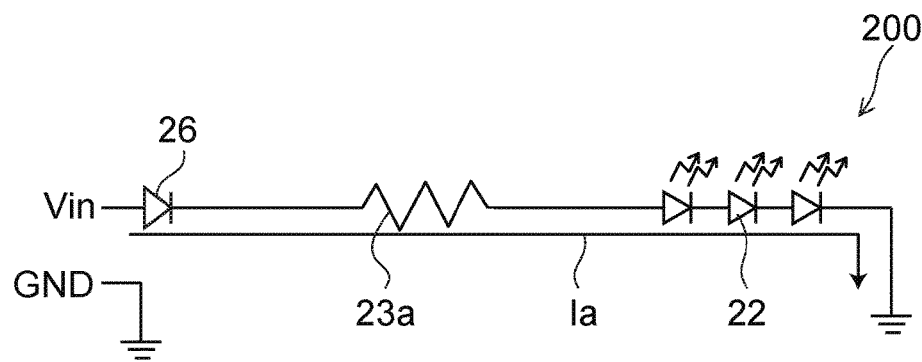
FIG. 3A is a circuit diagram illustrating a light emitting module according to a comparison example.

FIG. 3A is a circuit diagram illustrating the light emitting module 200 according to the comparison example.

Figure 3B:
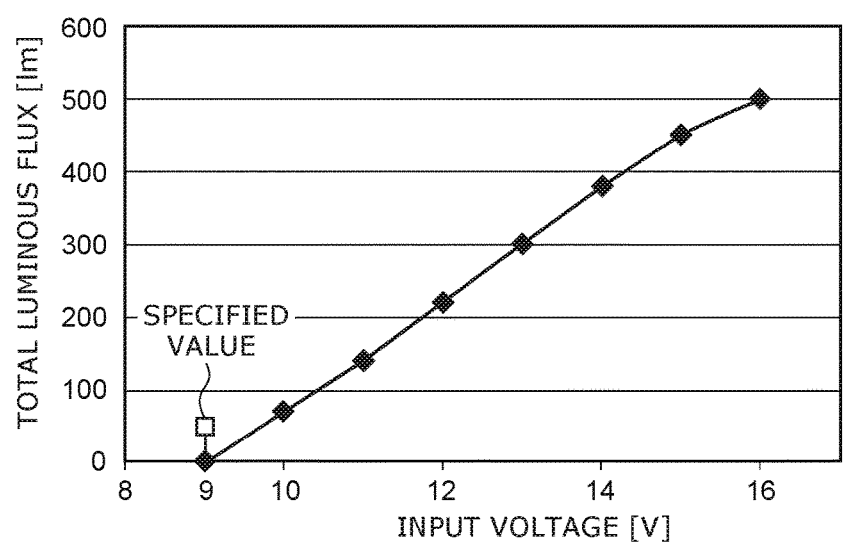
FIG. 3B is a graph illustrating a relationship between an input voltage and a total luminous flux in the light emitting module.

FIG. 3B is a graph illustrating a relationship between an input voltage and a total luminous flux in the light emitting module 200.

As illustrated in FIG. 3A, the light emitting module 200 is provided with a plurality of light emitting elements 22 and a resistor 23a. Similar to the light emitting module 20 described above, the plurality of the light emitting elements 22 and the resistor 23a are electrically connected to a wiring pattern 27 provided on a surface of a substrate 21. However, the light emitting module 200 is not provided with the diode 24 and the control portion 25.

Here, in a vehicle lighting device 1, a battery is power supply, but a voltage (input voltage) applied to the vehicle lighting device 1 fluctuates. For example, an operation standard voltage (rated voltage) of the vehicle lighting device 1 for a general automobile is approximately 13.5 V. However, the input voltage fluctuates due to a voltage drop of the battery, an operation of an alternator, an influence of a circuit, and the like. Therefore, in the vehicle lighting device 1 for an automobile, an operating voltage range (voltage fluctuation range) is determined. For example, the operating voltage range is generally equal to or more than 9 V and equal to or less than 16 V, and may also be equal to or more than 7 V and equal to or less than 16 V in some case.

Here, the light emitting element 22 has a forward voltage drop. Therefore, as illustrated in FIG. 3B, when the input voltage (applied voltage) of the plurality of the light emitting elements 22 which are connected in series decreases, the amount of light emitted from the plurality of the light emitting elements 22 decreases. Therefore, in the vicinity of a lower limit of the operating voltage range, there is a concern that the total luminous flux of the vehicle lighting device 1 is less than a specified value. For example, when the voltage drop of the light emitting elements 22 in the forward direction is approximately 3 V, if three light emitting elements 22 are connected in series, the voltage drop of 9 V generates. In addition, the resistor 23a is connected in series to the three light emitting elements 22. Therefore, when the input voltage is approximately 9 V, almost no current flows through the three light emitting elements 22 and the total luminous flux of the vehicle lighting device 1 is less than the specified value.

Figure 4A:
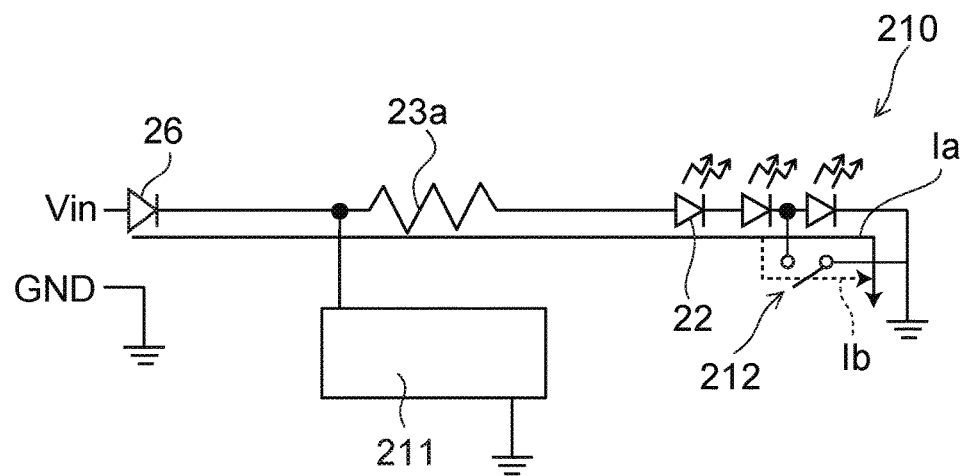
FIG. 4A is a circuit diagram illustrating a light emitting module according to a comparison example.

FIG. 4A is a circuit diagram illustrating a light emitting module 210 according to a comparison example.

Figure 4B:
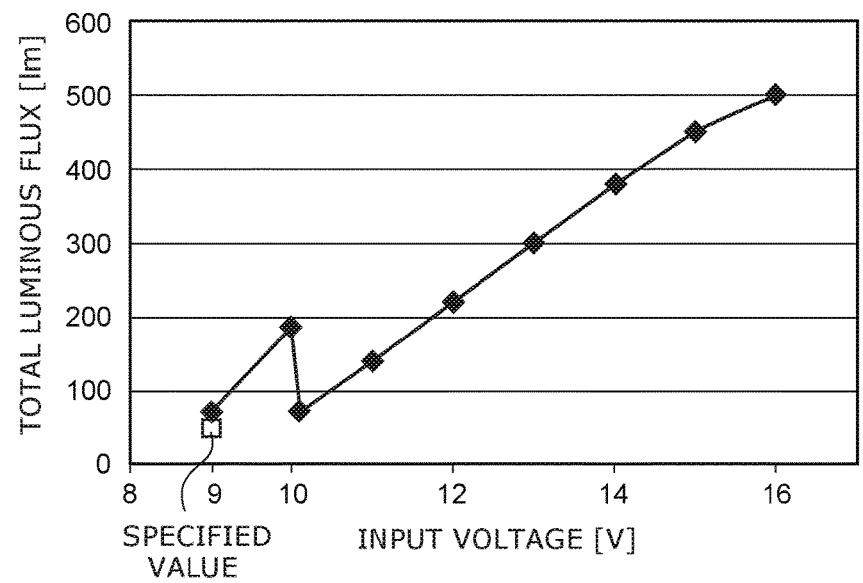
FIG. 4B is a graph illustrating a relationship between an input voltage and a total luminous flux in the light emitting module.

FIG. 4B is a graph illustrating a relationship between an input voltage and a total luminous flux in the light emitting module 210.

As illustrated in FIG. 4A, the light emitting module 210 is provided with a plurality of the light emitting elements 22, the resistor 23a, a voltmeter 211, and a switch 212.

The voltmeter 211 detects the input voltage. The three light emitting elements 22 are connected in series to the resistor 23a. The switch 212 is connected in parallel to one light emitting element 22 farthest from the input side.

When the input voltage detected by the voltmeter 211 exceeds a predetermined value, the switch 212 is opened. Then, a current Ia flows through the three light emitting elements 22 connected in series to each other and light is emitted from the three light emitting elements 22. On the other hand, when the input voltage detected by the voltmeter 211 reaches equal to or less than the predetermined value, the switch 212 is closed. Then, a current Ib flows through two light emitting elements 22 connected in series to each other and almost no current flows through the light emitting elements 22 connected in parallel to the switch 212. Therefore, the current flowing through the two light emitting elements 22 can be increased. As a result, it is possible to prevent the total luminous flux of the vehicle lighting device 1 from being less than the specified value in the vicinity of a lower limit of the operating voltage range. However, when the switch 212 is closed, the current flowing through the two light emitting elements 22 rapidly increases. Therefore, as illustrated in FIG. 4B, the total luminous flux rapidly increases in the vicinity of the lower limit of the operating voltage range.

Furthermore, in a case of the vehicle lighting device 1 provided in the automobile, there are the following problems.

In general, a detecting device 106 that detects a failure of the light emitting module 20 is provided in the automobile. For example, if the detecting device 106 detects the current flowing through the plurality of the light emitting elements 22 which are connected in series, and the detected current is equal to or less than a predetermined value, it is determined that a failure such as disconnection occurs in at least a part of the plurality of the light emitting elements 22. If it is determined that the failure occurs, the detecting device 106 causes a display for notifying the failure of the light emitting module 20 (vehicle lighting device 1) to be turned on in a meter panel or the like.

Here, a vehicle lighting device including an incandescent light bulb and a vehicle lighting device including the light emitting element 22 may be selectively used depending on a grade of a vehicle type or the like. For example, an inexpensive vehicle lighting device including the incandescent light bulb may be provided in a vehicle type of a lower grade and a relatively expensive vehicle lighting device including the light emitting element 22 may be provided in a vehicle type of a higher grade.

On the other hand, in many cases, the same detecting device 106 that detects the failure of the vehicle lighting device is used regardless of the grade of the vehicle type or the like. In this case, if the detecting device 106 is used, the number of thresholds (value of the input current) used for the determination of the failure is one. However, in general, a current flowing through the plurality of the light emitting elements 22 connected in series is smaller than a current flowing through the incandescent light bulb. Therefore, if the number of thresholds used for the determination of the failure is one, there is a concern that erroneous detection occurs. For example, if the threshold based on the current flowing through the plurality of the light emitting elements 22 is used, there is a concern that it is determined that there is no failure even if the failure occurs in the vehicle lighting device including the incandescent light bulb. If the threshold based on the current flowing through the incandescent light bulb is used, there is a concern that it is determined that the failure occurs even if there is no failure in the vehicle lighting device including the plurality of the light emitting elements 22. In this case, considering safety, it is preferable that the threshold based on the current flowing through the incandescent light bulb is used.

Therefore, in the vehicle lighting device 1 including the plurality of the light emitting elements 22, it is possible to secure the total luminous flux necessary when the input voltage decreases and even if the threshold based on the current flowing through the incandescent light bulb is used, it is required to be able to suppress erroneous detection related to the occurrence of the failure.

Furthermore, in the vehicle lighting device 1, it is preferable that an abrupt increase in the total luminous flux can be suppressed in the vicinity of the lower limit of the operating voltage range.

Figure 5A:
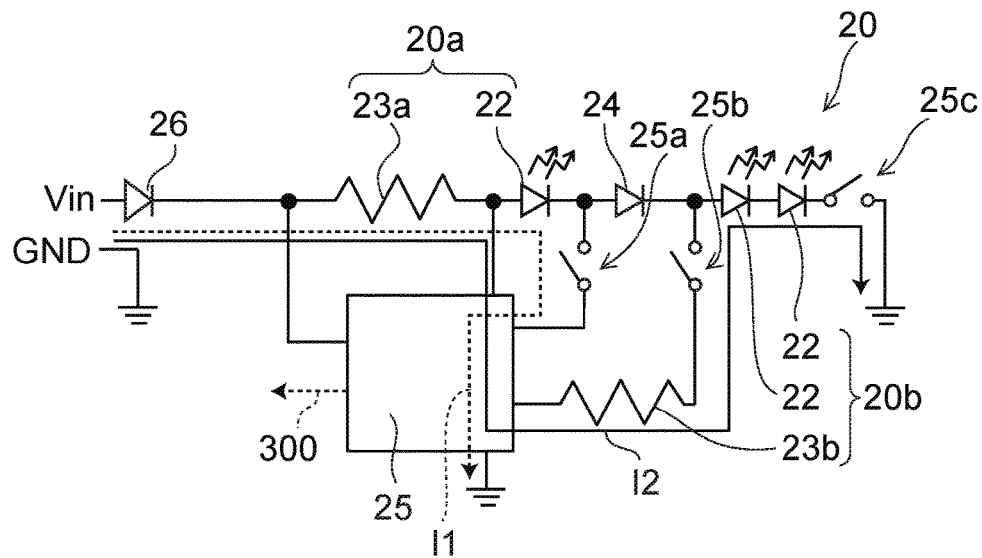
FIG. 5A is a circuit diagram illustrating a light emitting module.

FIG. 5A is a circuit diagram illustrating the light emitting module 20 according to an embodiment.

Figure 5B:
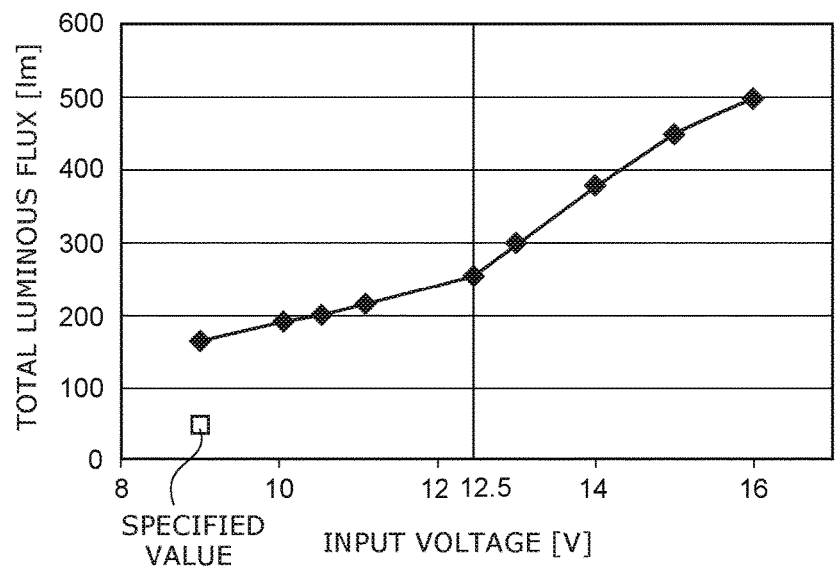
FIG. 5B is a graph illustrating a relationship between an input voltage and a total luminous flux in the light emitting module.

FIG. 5B is a graph illustrating a relationship between an input voltage and a total luminous flux in the light emitting module 20.

As illustrated in FIG. 5A, the light emitting module 20 has the circuit portion 20a, the circuit portion 20b, the diode 24, the control portion 25, and the diode 26.

The circuit portion 20a has at least one light emitting element 22. Moreover, the circuit portion 20a illustrated in FIG. 5A may have one light emitting element 22. In addition, the circuit portion 20a can further include the resistor 23a connected to the light emitting element 22 in series. Moreover, when a plurality of light emitting elements 22 are provided in the circuit portion 20a, the plurality of light emitting elements 22 which are connected in series and the resistor 23a are connected in series.

The circuit portion 20b has at least one light emitting element 22. Moreover, the circuit portion 20b illustrated in FIG. 5A may have two light emitting elements 22. In addition, the circuit portion 20b can further include the resistor 23b connected to the light emitting element 22 in series. When the plurality of light emitting elements 22 are provided in the circuit portion 20b, the plurality of light emitting elements 22 which are connected in series and the resistor 23b are connected in series.

The diode 24 is provided between the circuit portion 20a and the circuit portion 20b. An anode side of the diode 24 is electrically connected to the circuit portion 20a. A cathode side of the diode 24 is electrically connected to the circuit portion 20b. The diode 24 is provided so that the reverse voltage is not applied to the circuit portion 20a when the circuit portion 20a and the circuit portion 20b are connected in parallel.

If the control portion 25 detects the input voltage and the detected input voltage is equal to or less than a predetermined value, connects the circuit portion 20a and the circuit portion 20b are connected in parallel. In addition, when the detected input voltage exceeds the predetermined value, the control portion 25 causes the circuit portion 20a and the circuit portion 20b are connected in series. Therefore, the control portion 25 has a function of detecting the input voltage and a function of switch for switching the connection state of the circuit portion 20a and the circuit portion 20b.

For example, the control portion 25 has an input voltage determination circuit using a Zener diode (constant voltage diode), a comparator using an operational amplifier, or the like, and can detect the input voltage. For example, the control portion 25 has switches 25a to 25c that are switching elements (for example, transistors and the like), and can switch the connection state of the circuit portion 20a and the circuit portion 20b. For example, the control portion 25 includes a central processing unit (CPU), a storage device, and the like, and can perform various controls according to the detected input voltage. Moreover, various controls can be executed according to programs stored in the storage device.

When the detected input voltage exceeds a predetermined value, the control portion 25 opens the switches 25a and 25b (for example, the transistor is in an OFF state) and closes the switch 25c (for example, the transistor is in an ON state), thereby connecting the circuit portion 20a and the circuit portion 20b in series. Therefore, all the light emitting elements 22 are connected in series and light is emitted from all the light emitting elements 22.

On the other hand, the control portion 25 closes the switches 25a to 25c so as to cause the circuit portion 20a and the circuit portion 20b to be connected in parallel when the detected input voltage is equal to or less than the predetermined value. Therefore, a current I1 flows through the circuit portion 20a and a current I2 flows through the circuit portion 20b. In this case, the current I2 is prevented from flowing through the circuit portion 20a by the diode 24. In this way, it is possible to reduce the number of the light emitting elements 22 which are connected in series. That is, it is possible to reduce the forward voltage drop in the plurality of the light emitting elements 22. Therefore, it is possible to suppress that the total luminous flux of the vehicle lighting device 1 is less than the specified value in the vicinity of the lower limit of the operating voltage range.

Here, it is preferable that a voltage at which the control portion 25 switches the connection state between the circuit portion 20a and the circuit portion 20b is equal to or higher than a voltage corresponding to the threshold (current value) which is used for the failure determination of the light emitting module 20 by the detecting device. That is, it is preferable that the predetermined value described above is a value equal to or higher than a voltage corresponding to the current value used for the failure determination of the vehicle lighting device 1. For example, if the threshold used for the failure determination is 300 mA and a voltage which is higher than the voltage corresponding to the value of the threshold is 12.5 V, the control portion 25 can cause the circuit portion 20a and the circuit portion 20b to be connected in parallel if the input voltage is 12.5 V, and the circuit portion 20a and the circuit portion 20b to be connected in series if the input voltage is higher than 12.5 V (see FIG. 5B).

If the connection state between the circuit portion 20a and the circuit portion 20b is switched from the connection in series to the connection in parallel, the current (input current) flowing through the light emitting module 20 increases. Therefore, the input current can be suppressed to be equal to or less than the threshold used for the failure determination. Therefore, it is possible to suppress erroneous detection related to occurrence of the failure. Moreover, the voltage at which the connection state between the circuit portion 20a and the circuit portion 20b is switched by the control portion 25 can be determined by performing experiments and simulations in consideration of the threshold used for the failure determination, a degree of fluctuation of the input voltage, and the like.

In addition, if a resistor is provided in the circuit portion 20a, it is possible to control a value of the current I1. Moreover, a resistor may be provided in the circuit portion 20a if necessary. In addition, it is possible to control a value of the current I2 by adjusting a resistance value of the resistor 23b. If the values of the currents I1 and I2 are controlled, a sum of the current I1 and the current I2 can be made equal to the current flowing through the light emitting element 22 when connecting the circuit portion 20a and the circuit portion 20b in series. Therefore, it is possible to prevent the current flowing through the light emitting elements 22 provided in the circuit portion 20a and the circuit portion 20b from being rapidly increased when the connection state of the circuit portion 20a and the circuit portion 20b are changed from the connection in series to the connection in parallel. As a result, it is possible to prevent the total luminous flux from being rapidly increased in the vicinity of the lower limit of operating voltage range. Moreover, the values of the currents I1 and the current I2 can be same as each other and can be different from each other.

As described above, according to the vehicle lighting device 1 of the embodiment, as illustrated in FIG. 5B, even when the input voltage decreases, it is possible to secure a required total luminous flux and to suppress fluctuation of the total luminous flux. In addition, it is possible to suppress that the input current flowing through the light emitting module 20 is equal to or less than the threshold used for the failure determination, so that it is possible to suppress erroneous detection related to occurrence of the failure.

Here, if a sum of the forward voltage drops of the plurality of the light emitting elements 22 which are connected in series is set to be close to the input voltage, it is possible to improve the light emission efficiency and to reduce power consumption. Therefore, the control portion 25 appropriately changes the number and combination of the circuit portions which are connected in series based on the detected input voltage, so that the number (sum of the forward voltage drops) of the light emitting elements which are connected in series can be made appropriate.

Moreover, the number of the circuit portions or the number of the light emitting elements 22 provided in the circuit portions is not limited to the example described above and can be appropriately changed depending on the usage and the size of the vehicle lighting device 1, or the like.

That is, the control portion 25 can cause the plurality of the circuit portions to be connected in series when the input voltage exceeds a predetermined value, and at least one of the plurality of the circuit portions to be connected in parallel if the input voltage is equal to or less than the predetermined value.

Figure 6:
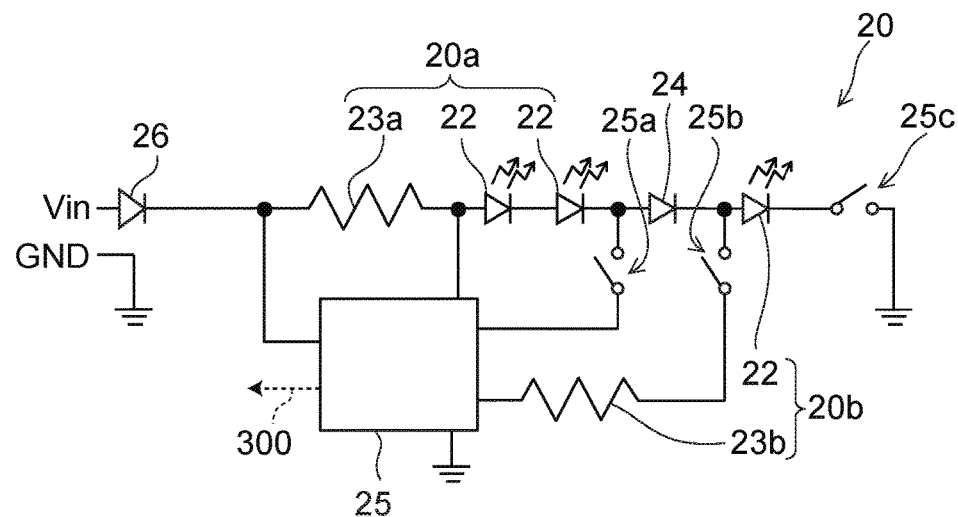
FIG. 6 is a circuit diagram illustrating a light emitting module according to another embodiment.

FIG. 6 is a circuit diagram illustrating a light emitting module 20 according to another embodiment.

As illustrated in FIG. 6, the light emitting module 20 has a circuit portion 20a, a circuit portion 20b, a diode 24, a control portion 25, and a diode 26.

As described above, the circuit portion 20a may have at least one light emitting element 22. For example, the circuit portion 20a illustrated in FIG. 5A has one light emitting element 22. The circuit portion 20a illustrated in FIG. 6 has two light emitting elements 22 connected in series. In addition, the circuit portion 20b may have at least one light emitting element 22. For example, the circuit portion 20b illustrated in FIG. 5A has two light emitting elements 22 which are connected in series. The circuit portion 20b illustrated in FIG. 6 has one light emitting element 22. Moreover, the number of the light emitting elements 22 provided in the circuit portion 20a and the circuit portion 20b is not limited to the example illustrated in FIGS. 5A and 6.

It is possible to enjoy the effects described above even by the embodiment. That is, even when the input voltage is lowered, it is possible to secure the required total luminous flux and to suppress fluctuation of the total luminous flux. In addition, it is possible to suppress that the input current flowing through the light emitting module 20 is equal to or less than the threshold used for the failure determination so that it is possible to suppress erroneous detection related to occurrence of the failure.

Figure 7:
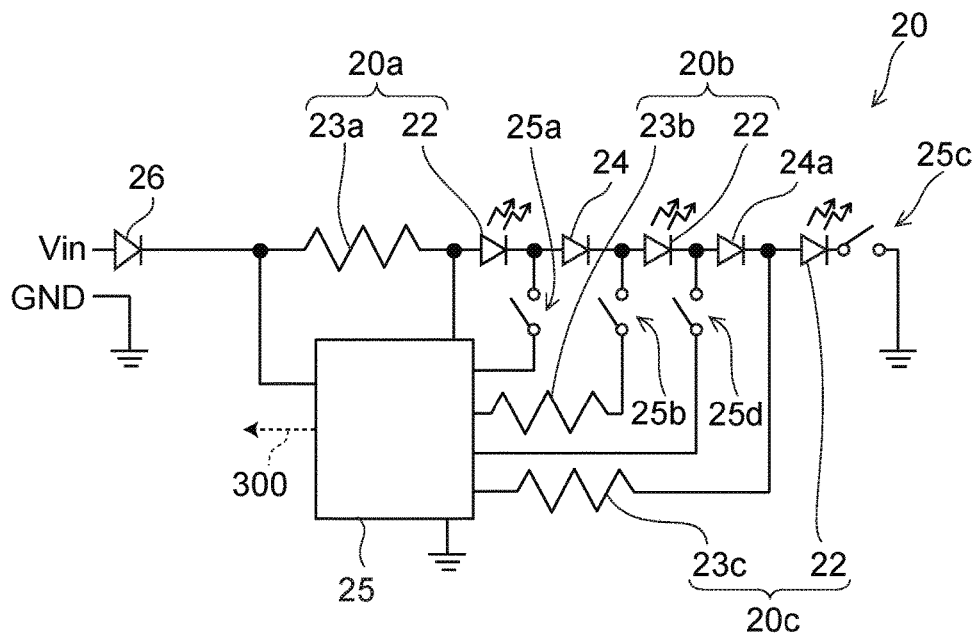
FIG. 7 is a circuit diagram illustrating a light emitting module according to still another embodiment.

FIG. 7 is a circuit diagram illustrating a light emitting module 20 according to still another embodiment.

As illustrated in FIG. 7, the light emitting module 20 has a circuit portion 20a, a circuit portion 20b, a circuit portion 20c, a diode 24, a diode 24a, a control portion 25, and a diode 26. The circuit portion 20c has at least one light emitting element 22. Moreover, the circuit portion 20c illustrated in FIG. 7 may have one light emitting element 22. In addition, the circuit portion 20c can further include a resistor 23c connected to the light emitting element 22 in series. Moreover, when a plurality of the light emitting elements 22 are provided in the circuit portion 20c, the plurality of the light emitting elements 22 which are connected in series and the resistor 23c are connected in series.

The diode 24a is provided between the circuit portion 20b and the circuit portion 20c. An anode side of the diode 24a is electrically connected to the circuit portion 20b. A cathode side of the diode 24a is electrically connected to the circuit portion 20c. The diode 24a is provided so that a reverse voltage is not applied to the circuit portion 20b when the circuit portion 20b and the circuit portion 20c are connected in parallel.

The control portion 25 detects an input voltage and causes the circuit portion 20a, the circuit portion 20b, and the circuit portion 20c to be connected in series, to be connected in series and in parallel, or to be connected in parallel based on the detected input voltage. For example, the control portion 25 has switches 25a to 25d that are switching elements (for example, transistors or the like) and can switch the connection state of the circuit portion 20a, the circuit portion 20b, and the circuit portion 20c.

In this case, for example, the control portion 25 causes the circuit portion 20a, the circuit portion 20b, and the circuit portion 20c to be connected in series by opening the switches 25a, 25b, and 25d, and closing the switch 25c. For example, the control portion 25 causes the circuit portion 20c to be connected in parallel to the light emitting elements 22 of the circuit portion 20a and the circuit portion 20b that are connected in series by opening the switches 25a and 25b, and closing the switches 25c and 25d. For example, the control portion 25 causes the circuit portion 20a to be connected in parallel to the light emitting element 22 of the circuit portion 20b and the light emitting element 22 of the circuit portion 20c that are connected in series by opening the switch 25d, and closing the switches 25a, 25b, and 25c. For example, the control portion 25 causes the light emitting element 22 of the circuit portion 20a, the light emitting element 22 of the circuit portion 20b, and the light emitting element 22 of the circuit portion 20c to be connected in parallel by closing the switches 25a to 25d. That is, the control portion 25 can appropriately change the number of the circuit portions that are connected in series (or the number of the circuit portions that are connected in parallel), or a combination thereof.

The effect described above can also be enjoyed by the embodiment. That is, even when the input voltage is lowered, it is possible to secure the required total luminous flux and to suppress fluctuation of the total luminous flux. In addition, it is possible to suppress that the input current flowing through the light emitting module 20 is equal to or less than the threshold used for the failure determination so that it is possible to suppress erroneous detection related to occurrence of the failure.

Figure 8:
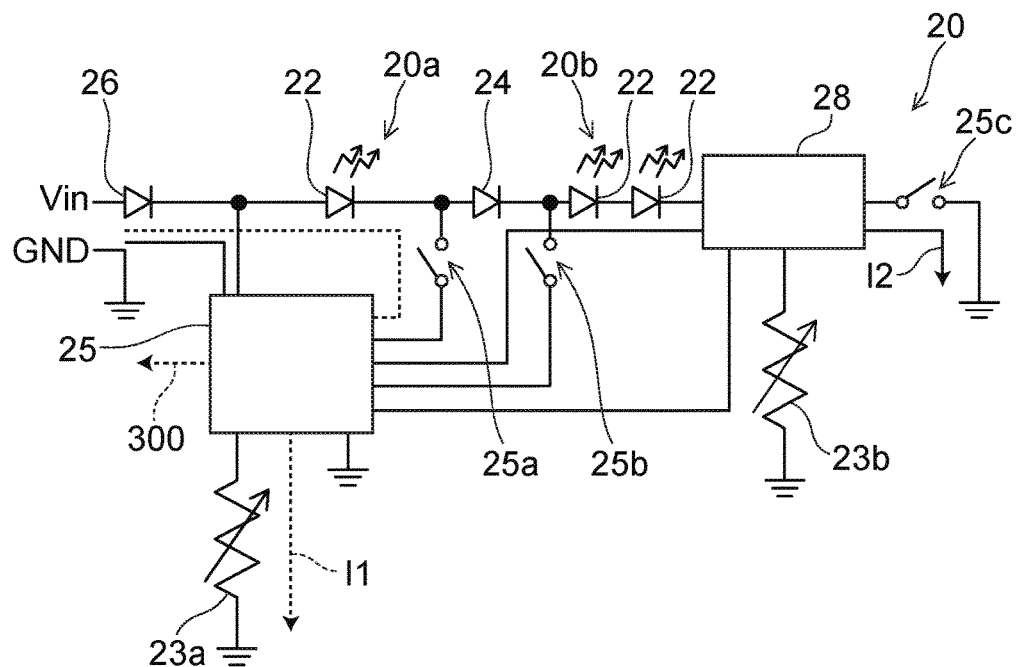
FIG. 8 is a circuit diagram illustrating a light emitting module according to further still another embodiment.

FIG. 8 is a circuit diagram illustrating a light emitting module 20 according to further still another embodiment.

As illustrated in FIG. 8, the light emitting module 20 has a circuit portion 20a, a circuit portion 20b, a diode 24, a control portion 25, a diode 26, and a constant current portion 28. That is, the light emitting module 20 according to the embodiment further includes the constant current portion 28. In addition, a resistor 23a is provided on an output side of the control portion 25. A resistor 23b is provided on an output side of the light emitting element 22.

The constant current portion 28 is electrically connected between the circuit portion 20b and the switch 25c.

If the circuit portion 20a and the circuit portion 20b are connected in series by the control portion 25, the constant current portion 28 causes a current (current flowing through all the light emitting elements 22) flowing through the circuit portion 20a and the circuit portion 20b to be constant.

If the circuit portion 20a and the circuit portion 20b are connected in parallel by the control portion 25, the constant current portion 28 causes the current flowing through the circuit portion 20b to be constant.

That is, the constant current portion 28 is electrically connected to a plurality of circuit portions. If the plurality of the circuit portions are connected in series, the constant current portion 28 causes the current flowing through the plurality of the circuit portions to be constant and if at least one of the plurality of the circuit portions are connected in parallel, causes the current flowing through a predetermined circuit portion to be constant.

The constant current portion 28 can be a mirror circuit, a constant current circuit having a constant current diode, a current limiter circuit having a transistor, a constant current IC, or the like.

If the constant current portion 28 is provided, even if the input voltage fluctuates, the current flowing through the circuit portion 20a and the circuit portion 20b can be constant. That is, it is possible to suppress that the input current flowing through the light emitting module 20 fluctuates. Therefore, it is possible to easily suppress that the input current flowing through the light emitting module 20 is equal to or less than the threshold used for the failure determination.

Figure 9:
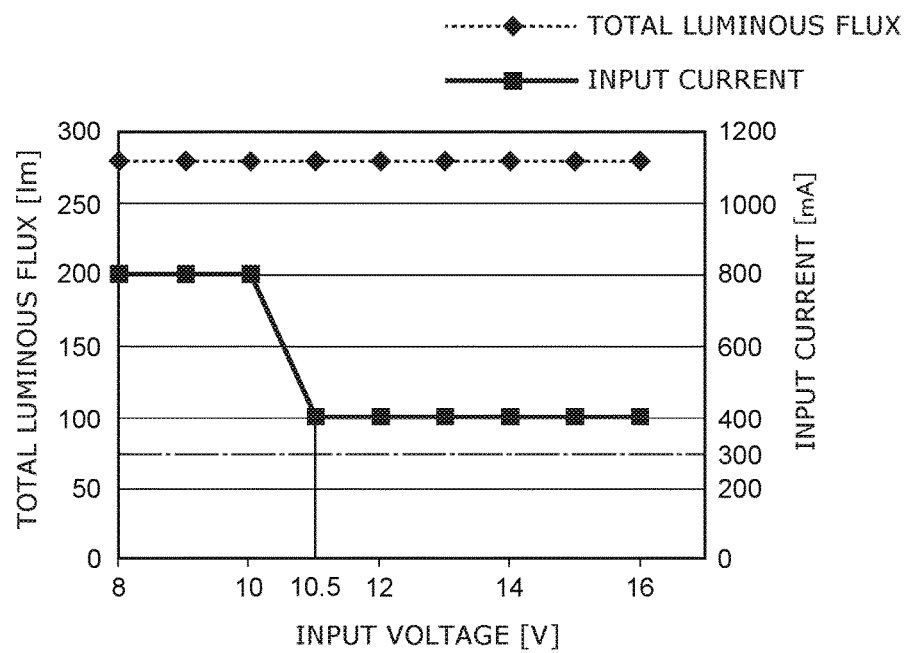
FIG. 9 is a graph illustrating an effect of a constant current portion.

FIG. 9 is a graph illustrating an effect of the constant current portion 28.

In FIG. 9, when the input voltage is equal to or higher than 10.5 V, the circuit portion 20a and the circuit portion 20b are connected in series, and when the input voltage is less than 10.5 V, the circuit portion 20a and the circuit portion 20b are connected in parallel. In addition, the threshold used for the failure determination is 300 mA.

As illustrated in FIG. 9, if the constant current portion 28 is provided, even if the input voltage fluctuates, the current flowing through the circuit portion 20a and the circuit portion 20b can be constant.

Moreover, in FIG. 9, the value of the current flowing through the circuit portion 20a and the value of the current flowing through the circuit portion 20b are the same. Therefore, when the input voltage is less than 10.5 V and the circuit portion 20a and the circuit portion 20b are connected in parallel, the input current is doubled.

However, even if the circuit portion 20a and the circuit portion 20b are connected in series, or even if the circuit portion 20a and the circuit portion 20b are connected in parallel, the currents flowing through the light emitting elements 22 are the same. Therefore, as illustrated in FIG. 9, even if the input voltage fluctuates, the total luminous flux is easily constant.

Figure 10:
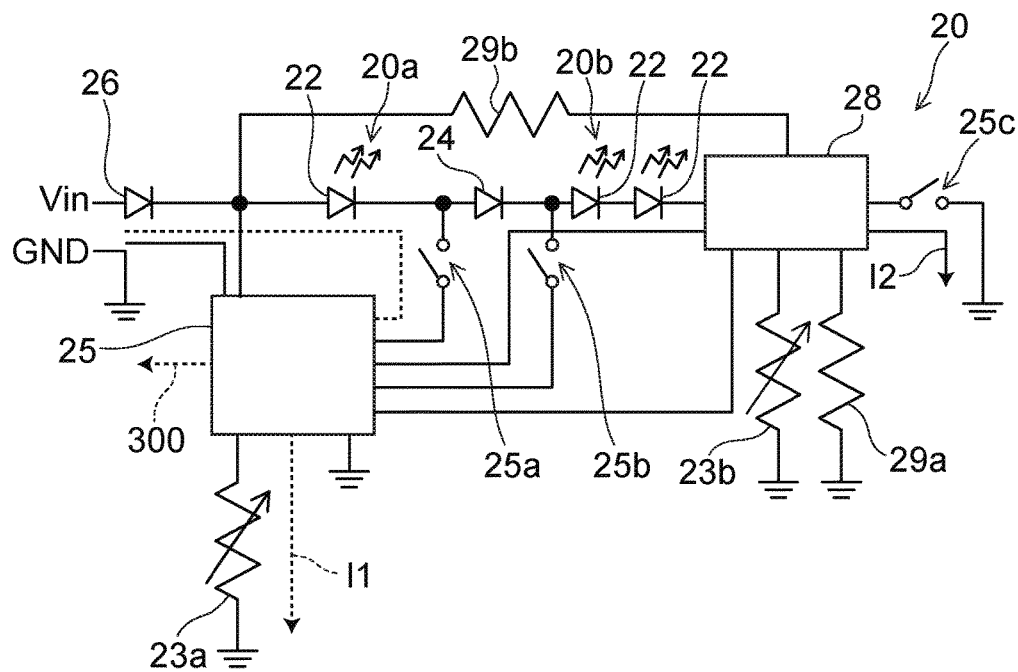
FIG. 10 is a circuit diagram illustrating a light emitting module according to further still another embodiment.

FIG. 10 is a circuit diagram illustrating a light emitting module 20 according to further still another embodiment.

Figure 11:
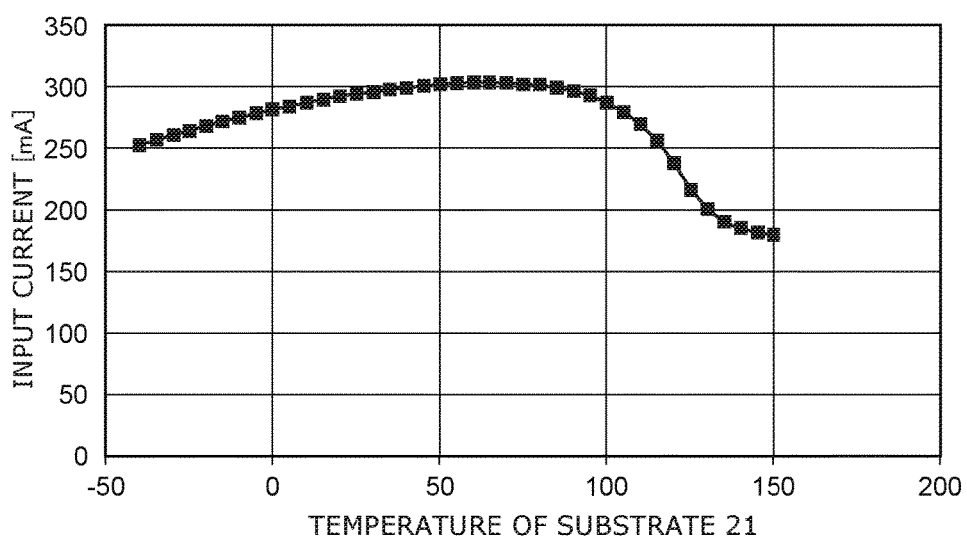
FIG. 11 is a graph illustrating an effect of a control element.

FIG. 11 is a graph illustrating an effect of a control element 29a (corresponding to an example of a first control element).

Figure 12:
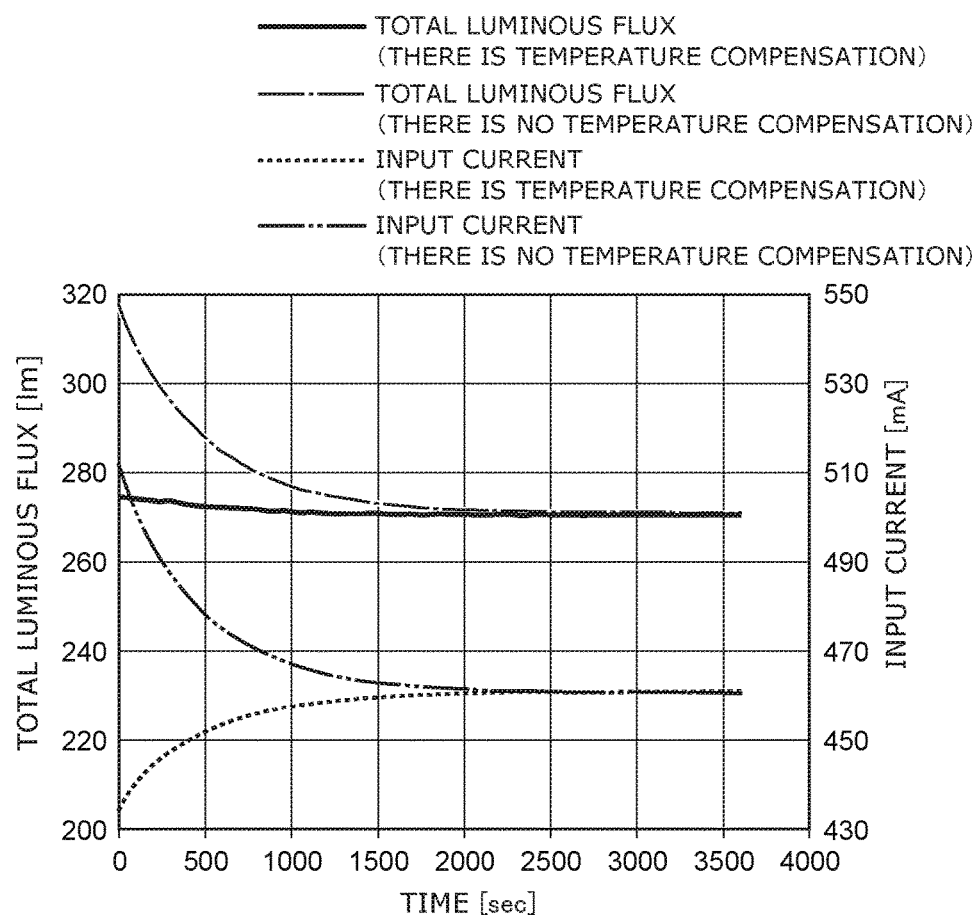
FIG. 12 is a graph illustrating an effect of a control element.

FIG. 12 is a graph illustrating an effect of a control element 29b (corresponding to an example of a second control element).

As illustrated in FIG. 10, the light emitting module 20 has a circuit portion 20a, a circuit portion 20b, a diode 24, a control portion 25, a diode 26, a constant current portion 28, the control element 29a, and the control element 29b.

The control element 29a is electrically connected to the constant current portion 28. It is preferable that the control element 29a is provided in the vicinity of a region in which the light emitting element 22 of a substrate 21 is provided. The control element 29a detects a temperature of the light emitting element 22 via the substrate 21. In addition, the control element 29a prevents a junction temperature of the light emitting element 22 from exceeding a maximum rating. That is, the control element 29a decreases the input current so that the junction temperature of the light emitting element 22 is equal to or less than the maximum rating.

For example, as illustrated in FIG. 11, when the temperature of the substrate 21 increases, the control element 29a reduces the input current. The control element 29a can be, for example, a thermistor connected to the constant current portion 28 in series.

If the control element 29a is provided, even when a surrounding temperature increases, lighting of the light emitting element 22 that does not exceed the rating can be performed.

The control element 29b is electrically connected to the constant current portion 28. The control element 29b is connected to the circuit portion 20a and the circuit portion 20b in parallel. It is preferable that the control element 29b is provided in the vicinity of a region in which the light emitting element 22 of the substrate 21 is provided. The control element 29b detects the temperature of the light emitting element 22 via the substrate 21. In this case, if the total luminous flux increases, the temperature of the light emitting element 22 increases.

When the temperature of the light emitting element 22 is low, that is, when the light emission efficiency of the light emitting element 22 is improved, the control element 29b decreases the input current and gradually increases the input current in accordance with the temperature increase in the light emitting element 22. That is, the control element 29b increases the input current depending on the light emission efficiency of the light emitting element 22.

For example, as illustrated in FIG. 12, when the temperature of the light emitting element 22 is low, the control element 29b decreases the input current. The control element 29b can be, for example, a thermistor connected to the circuit portion 20a and the circuit portion 20b in parallel.

If the control element 29b is provided, it is possible to suppress fluctuation of the total luminous flux.

Next, an operation of the control portion 25 illustrated in FIGS. 5A to 12 will be further described.

Failure may occur in one of the plurality of the light emitting elements 22. For example, open failure may occur in one of the plurality of the light emitting elements 22. When all the light emitting elements 22 are connected in series, if the open failure occurs in one of the light emitting elements, all the light emitting elements 22 are turned off. Therefore, a driver or a passenger can recognize the failure of the vehicle lighting device 1.

However, as described above, when the input voltage is lowered, the circuit portions having the light emitting elements 22 are connected in parallel. Therefore, the circuit portion having the light emitting element 22 in which failure does not occur and the circuit portion having the light emitting element 22 in which failure occurs may be connected in parallel. In this case, light is emitted from the circuit portion having the light emitting element 22 in which failure does not occur. If light is emitted from the circuit portion having the light emitting element 22 in which failure does not occur, the driver or the passenger may not recognize the failure of the vehicle lighting device 1.

Therefore, the control portion 25 can include functions of detecting the current flowing through each of the plurality of the circuit portions and determining the presence or absence of the failure of the light emitting element 22. For example, if the open failure occurs in the light emitting element 22, a current does not flow through the circuit portion having the light emitting element 22 in which failure occurs. Therefore, if the current flowing through the circuit portion is detected, it is possible to determine the presence or absence of the failure of the light emitting element 22.

The control portion 25 can turn off all the light emitting elements 22 when it is determined that the open failure occurs in the light emitting element 22. For example, the control portion 25 opens the switches 25a to 25d described above and can block the current flowing through all the circuit portions.

In addition, the control portion 25 can block the current flowing through the circuit portion having the light emitting element 22 in which the open failure does not occur by controlling the switches 25a to 25d described above.

In addition, the control portion 25 can also transmit a warning signal 300 to an external device when it is determined that the open failure occurs in the light emitting element 22.

Here, it is considered that the luminous flux of light emitted from the light emitting elements 22 is substantially proportional to the value of the current flowing through the light emitting element 22.

Therefore, the control portion 25 can further include a control circuit (for example, an amplifier circuit, an attenuation circuit, or the like) that changes at least a part of the current flowing through the plurality of the circuit portions or the voltage applied to the plurality of the circuit portions. Moreover, since known technique can be applied to the amplifier circuit and the attenuation circuit, detailed description thereof will be omitted.

For example, when it is determined that open failure occurs in the light emitting element 22, the control portion 25 causes at least a part of the current flowing through the circuit portion having the light emitting element 22 in which failure does not occur and the voltage applied to the circuit portion to be increased, and can compensate for a reduced luminous flux due to the occurrence of failure. That is, the control portion 25 causes at least a part of the current flowing through the circuit portion having the light emitting element 22 in which failure does not occur and the voltage applied to the circuit portion to be increased, and the total luminous flux can be maintained.

In addition, the control portion 25 causes at least a part of the current flowing through the circuit portion having the light emitting element 22 in which failure does not occur and the voltage applied to the circuit portion to be decreased when it is determined that the open failure occurs in the light emitting element 22, and the driver or the passenger can recognize the failure of the vehicle lighting device 1. For example, the control portion 25 causes at least a part of the current flowing through the circuit portion having the light emitting element 22 in which failure does not occur and the voltage applied to the circuit portion to be equal to or less than 1/10.

As described above, the control portion 25 detects the current flowing through each of the plurality of the circuit portions and determines the presence or absence of failure of the light emitting element 22 based on the detected current.

For example, the control portion 25 blocks the current flowing through the plurality of the circuit portions when it is determined that failure occurs in the light emitting element 22.

For example, the control portion 25 blocks the current flowing through the circuit portion having the light emitting element 22 in which failure does not occur when it is determined that failure occurs in the light emitting element 22. The control portion 25 can further include a control circuit that changes at least one of the current flowing through the plurality of the circuit portions and the voltage applied to the plurality of the circuit portions. Therefore, the control portion 25 causes at least a part of the current flowing through the circuit portion having the light emitting element 22 in which failure does not occur and the voltage applied to the circuit portion to be increased by the control circuit when it is determined that failure occurs in the light emitting element 22.

In addition, the control portion 25 can cause at least a part of the current flowing through the circuit portion having the light emitting element 22 in which failure does not occur and the voltage applied to the circuit portion to be decreased by the control circuit when it is determined that failure occurs in the light emitting element 22.

Next, the vehicle lamp 100 is exemplified.

Moreover, hereinafter, as an example, a case of a front combination light in which the vehicle lamp 100 is provided in the automobile will be described. However, the vehicle lamp 100 is not limited to the front combination light provided in the automobile. The vehicle lamp 100 may be a vehicle lamp provided in an automobile, a railway vehicle, and the like.

Figure 13:
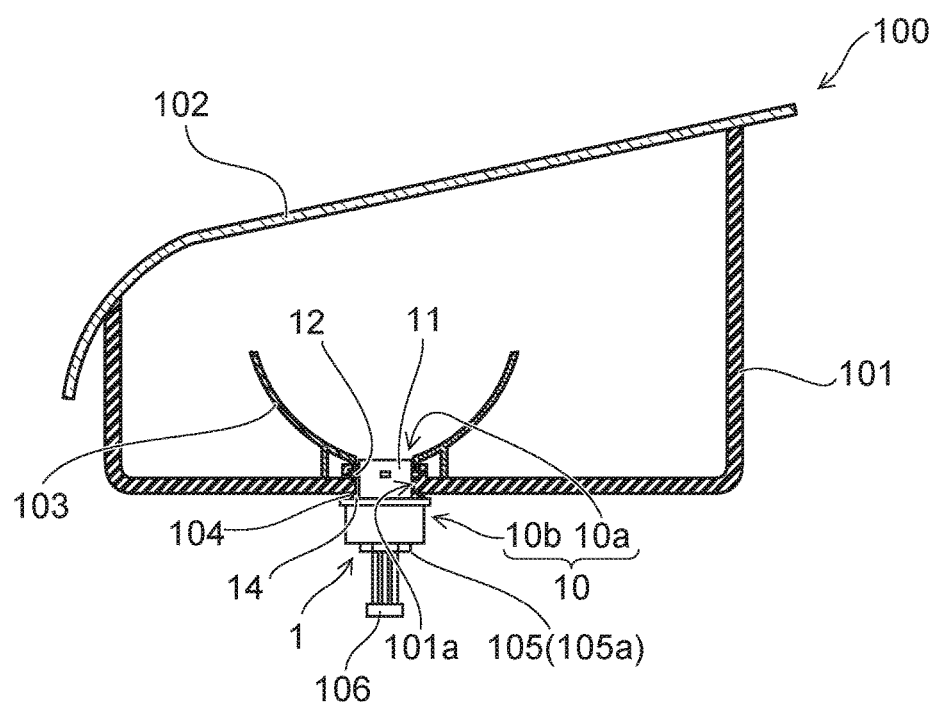
FIG. 13 is a partial sectional view schematically illustrating a vehicle lamp.

FIG. 13 is a partial sectional view schematically illustrating the vehicle lamp 100.

As illustrated in FIG. 13, the vehicle lighting device 1, a housing 101, a cover 102, an optical element portion 103, a sealing member 104, the connector 105, and the detecting device 106 are provided in the vehicle lamp 100.

The housing 101 has a box shape of which one end portion is opened. The housing 101 can be formed of, for example, resin and the like through which light is not transmitted. An attachment hole 101a into which a portion of the mounting portion 11 in which the bayonets 12 are provided is inserted is provided in a bottom surface of the housing 101. Recessed portions into which the bayonets 12 provided in the mounting portion 11 are inserted are provided in a periphery of the attachment hole 101a. Moreover, a case where the attachment hole 101a is directly provided in the housing 101 is exemplified, but an attaching member having the attachment hole 101a may be provided in the housing 101.

When attaching the vehicle lighting device 1 to the vehicle lamp 100 (housing 101), portions of the mounting portion 11 in which the bayonets 12 are provided are inserted into the attachment holes 101a and the vehicle lighting device 1 is rotated. Then, the bayonets 12 are held by the recessed portions provided on the periphery of the attachment hole 101a. Such an attaching method is called a twist-lock.

When attaching the vehicle lighting device 1 to the vehicle lamp 100, the vehicle lighting device 1 is attached in the direction illustrated in FIG. 1.

That is, the plurality of the light emitting elements 22 are provided side by side in a row in the horizontal direction. Therefore, it is possible to obtain the light distribution characteristics for vehicle which are wide in the horizontal direction and are narrow in the vertical direction.

In addition, the plurality of the power supply terminals 31 are provided side by side in a row in the vertical direction. The plurality of the heat radiating fins 16 are provided side by side in a row in the horizontal direction. The heat radiating fins 16 have the shape extending straightly in the vertical direction. Therefore, the flow of the rising air flow in the region in which the plurality of the heat radiating fins 16 are provided can be prevented from being hindered by the projection portion 17, the connector 105, and the heat radiating fins 16.

The cover 102 is provided so as to close an opening of the housing 101. The cover 102 can be formed of resin and the like having a light-transmitting property. The cover 102 can have functions of a lens and the like.

Light emitted from the vehicle lighting device 1 is incident on the optical element portion 103. The optical element portion 103 performs reflection, diffusion, guiding, and condensing of the light emitted from the vehicle lighting device 1, formation of a predetermined light distribution pattern, and the like.

For example, the optical element portion 103 illustrated in FIG. 13 is a reflector. In this case, the optical element portion 103 reflects the light emitted from the vehicle lighting device 1, and causes the predetermined light distribution pattern to be formed. If the optical element portion 103 is the reflector, the optical element portion 103 can be provided on the inside of the housing 101 so as to be coaxially with the center axis of the attachment hole 101a.

The sealing member 104 is provided between the flange 14 and the housing 101. The sealing member 104 can have an annular shape. The sealing member 104 can be formed of a material having elasticity such as rubber or silicone resin.

When attaching the vehicle lighting device 1 to the vehicle lamp 100, the sealing member 104 is interposed between the flange 14 and the housing 101. Thus, an inside space of the housing 101 is sealed by the sealing member 104. In addition, the bayonets 12 are pressed against the housing 101 by elastic force of the sealing member 104. Thus, the vehicle lighting device 1 can be suppressed to be separated from the housing 101.

The connectors 105 are fitted into end portions of the plurality of the power supply terminals 31 exposed on the inside of the hole 17a. Power supply (not illustrated) and the like are electrically connected to the connectors 105. Therefore, power supply (not illustrated) and the like are electrically connected to the light emitting elements 22 by fitting the connectors 105 into the end portions of the power supply terminals 31.

In addition, the connectors 105 have stepped portions. Then, the sealing member 105a is attached to the stepped portions (see FIG. 2). The sealing member 105a is provided to prevent entrance of water on the inside of the hole 17a. When the connector 105 having the sealing member 105a is inserted into the hole 17a, the hole 17a is sealed to be water tightness.

The sealing member 105a can have an annular shape. The sealing member 105a can be formed of a material having elasticity such as rubber or silicone resin. The connector 105 can also be joined, for example, to an element on the socket 10 side using adhesive or the like.

The detecting device 106 is electrically connected to the vehicle lighting device 1 (light emitting module 20) via the connector 105. The detecting device 106 performs the failure determination of the vehicle lighting device 1. For example, when the detecting device 106 detects the current flowing through the plurality of the light emitting elements 22 and the detected current is equal to or less than a predetermined value, it is determined that the failure such as disconnection occurs in at least a part of the plurality of the light emitting elements 22. If it is determined that a failure occurs, for example, the detecting device 106 causes a display for notifying the failure of the vehicle lighting device 1 to be turned on in a meter panel or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Moreover, above-mentioned embodiments can be combined mutually and can be carried out.

What is claimed is:

1. A vehicle lighting device comprising:
   a plurality of circuit portions each of which has at least one light emitting element;
   a control portion that is electrically connected to the plurality of the circuit portions; and
   a constant current portion that is electrically connected to at least a part of the plurality of the circuit portions,
   the control portion connects the plurality of the circuit portions in series if an input voltage exceeds a predetermined value, and connects at least a part of the plurality of the circuit portions in parallel if the input voltage is equal to or less than the predetermined value, and
   the predetermined value is a value equal to or higher than a voltage corresponding to a current value used for failure determination of the vehicle lighting device,
   wherein the constant current portion causes a current flowing through the plurality of the circuit portions to be constant if the plurality of the circuit portions are connected in series, and a current flowing through a predetermined circuit portion to be constant if at least a part of the plurality of the circuit portions is connected in parallel.

2. The device according to claim 1, further comprising:
   a diode of which an anode side is electrically connected to an output side of a first circuit portion and a cathode side is electrically connected to an input side of a second circuit portion.

3. The device according to claim 2, wherein
   the control portion is connected to the first circuit portion and the second circuit portion in series if the input voltage exceeds a predetermined value, and is connected to the first circuit portion and the second circuit portion in parallel if the input voltage is equal to or less than the predetermined value, and
   the diode suppresses that a reverse voltage is applied to the first circuit portion when the first circuit portion and the second circuit portion are connected in parallel.

4. The device according to claim 3, wherein when the first circuit portion and the second circuit portion are connected in parallel, light is emitted from at least one light emitting element included in the first circuit portion, and at least one light emitting element included in the second circuit portion.

5. The device according to claim 1, wherein the constant current portion is at least a part of a mirror circuit, a constant current circuit having a constant current diode, a current limiter circuit having a transistor, and a constant current IC.

6. The device according to claim 1, further comprising:
   a first control element that reduces an input current so that a junction temperature of the light emitting element is equal to or less than a maximum rating.

7. The device according to claim 6, wherein the first control element is a thermistor.

8. The device according to claim 6,
   wherein the first control element is connected to the constant current portion in series.

9. The device according to claim 1, further comprising:
   a second control element that reduces an input current depending on an increase in a total luminous flux of the light emitting element.

10. The device according to claim 9, wherein the second control element is a thermistor.

11. The device according to claim 9,
    wherein the second control element is connected to the plurality of the circuit portions in parallel.

12. The device according to claim 1, wherein
    the control portion includes an input voltage determination circuit having a Zener diode, or a comparator having an operational amplifier, and
    the input voltage determination circuit or the comparator detects the input voltage.

13. The device according to claim 4, wherein
    the control portion includes a switching element, and
    the control portion executes switching of a connection state of the plurality of the circuit portions by the switching element based on the detected input voltage.

14. The device according to claim 1, wherein
    the control portion includes a CPU and a storage device, and
    the CPU executes switching of a connection state of the plurality of the circuit portions based on a program stored in the storage device.

15. The device according to claim 1, wherein a resistor that is connected to the light emitting element in series is further provided in at least a part of the plurality of the circuit portions.

16. A vehicle lamp comprising:
the vehicle lighting device according to claim 1; and
a housing to which the vehicle lighting device is attached.

17. The lamp according to claim 16, further comprising:
a detecting device that performs a failure determination of the vehicle lighting device.

\* \* \* \* \*